United States Patent [19]

Mueller

[11] Patent Number: 5,996,936
[45] Date of Patent: Dec. 7, 1999

[54] FLUIDIC THROAT EXHAUST NOZZLE

[75] Inventor: John H. Mueller, Cincinnati, Ohio

[73] Assignee: General Electric Company, Cincinnati, Ohio

[21] Appl. No.: 08/939,384

[22] Filed: Sep. 29, 1997

[51] Int. Cl.$^6$ .................................................. B64D 27/10
[52] U.S. Cl. ................ 244/53 R; 244/73 R; 239/265.23; 239/265.17
[58] Field of Search .................................... 244/64, 53 R, 244/73 R, 74; 60/230, 231, 271; 239/265.23, 265.17

[56] References Cited

U.S. PATENT DOCUMENTS

| | | |
|---|---|---|
| 2,699,906 | 1/1955 | Lee et al. . |
| 2,948,148 | 8/1960 | La Salle et al. . |
| 3,000,178 | 9/1961 | Logerot . |
| 3,288,373 | 11/1966 | Pike . |
| 3,289,410 | 12/1966 | Balwanz . |
| 3,325,103 | 6/1967 | Abbott . |
| 3,370,794 | 2/1968 | Drewry et al. . |
| 5,664,415 | 9/1997 | Terrier . |

FOREIGN PATENT DOCUMENTS 618830  4/1961  Canada ...................................... 60/231

OTHER PUBLICATIONS

Catt et al, "A Static Investigation of Fixed–Geometry Nozzles Using Fluidic Injection . . . " AIAA, Jul. 10, 1995.
Miller et al, "Conceptual Development of Fixed–Geometry . . . " AIAA, Jul. 12, 1998.
J. Federspiel, "Fluidic Control of Nozzle Flow . . . " AIAA, Jul. 12, 1998.
Traeger, Aircraft Gas Turbine Engine Technology, 1979, pp. 152–155, 390, 391, 400, & 412.
United Aircraft Corporation, "A Theoretical and Experimental Study of Thrust Vector Control by Secondary Gas Injection," Report B910063–9, 1963, pp. cover, 25, 28, Figs 1, 18, 7 19.
Guhse, " An Experimental Investigation of Thust Vector Control by Secondary Injection," NASA CR–297, older than 1 year, pp. cover, 21, 22, & 27.
Federspiel, "Fluidic Control of Nozzle Flow—Some Performance Measurements," AIAA 95–2605, Jul. 10–12, 1995, pp. cover and 1–8.

*Primary Examiner*—Peter M. Poon
*Assistant Examiner*—Tien Dinh
*Attorney, Agent, or Firm*—Andrew C. Hess; Rodney M. Young

[57] ABSTRACT

An exhaust nozzle for a gas turbine engine includes a converging inlet duct disposed in flow communication with a diverging outlet duct at a throat therebetween. An ejection slot is disposed at the throat, and compressed air from the engine is selectively injected through the slot for fluidically varying flow area at the throat for exhaust gases from the engine.

13 Claims, 3 Drawing Sheets

FLUIDIC THROAT EXHAUST NOZZLE

CROSS REFERENCE TO RELATED APPLICATION

This application is related to concurrently filed applications Ser. No. 08/939,799 entitled "Integrated Fluidic CD Nozzle;" and Ser. No. 08/939,797 entitled "Faceted Exhaust Nozzle."

The U.S. Government has rights in this invention in accordance with Contract No. F33615-91-C-2119 awarded by the Department of the Air Force.

BACKGROUND OF THE INVENTION

The present invention relates generally to gas turbine engines, and, more specifically, to variable area exhaust nozzles therefor.

One type of turbofan gas turbine engine for powering an aircraft in flight includes an afterburner or augmenter for providing additional thrust when desired, with a variable area exhaust nozzle disposed at the aft end thereof. Since the engine operates at varying power levels including idle, cruise, and maximum afterburner, the exhaust nozzle is suitably adjustable for optimizing performance with maximum efficiency.

A typical variable area exhaust nozzle includes a converging duct defined by a plurality of circumferentially adjoining primary exhaust flaps pivoted at their leading edges to an outer casing. A diverging duct is defined by a plurality of circumferentially adjoining secondary exhaust flaps pivoted at their leading edges to the trailing edges of the primary flaps. The trailing edges of the secondary flaps are pivotally joined to a plurality of circumferentially adjoining outer flaps which in turn are joined to the outer casing. The nozzle includes an inlet at the entrance to the converging duct, a throat of minimum flow area, designated $A_8$, at the juncture between the converging and diverging ducts, and an outlet having a larger flow area, designated $A_9$.

During operation, suitable actuators pivot radially inwardly and outwardly the primary flaps to adjust the angle of convergence and the throat area, and in turn adjust the angle of divergence of the secondary flaps and the outlet area. In this way, the exhaust gases from the engine may be accelerated in the converging duct to a choked velocity of Mach 1 at the throat, and then expanded in the diverging duct at supersonic velocities for enhanced performance.

The resulting variable area exhaust nozzle is relatively complex in construction and requires many individual components pivotally joined together, and adjusted in position using suitable actuators and linkages. The individual primary and secondary flaps must be suitably sealed at their junctions to control undesirable leakage of the exhaust gases therebetween.

Fixed area exhaust nozzle are also known but are used in less demanding applications. For example, a simple converging nozzle may be used without a cooperating diverging nozzle, with fixed inlet and throat flow areas. Or, a fixed diverging nozzle may be used in conjunction with the fixed converging nozzle with the flow areas at the inlet, throat, and outlet also being fixed and therefore optimized for only a single region of engine performance. Fixed area converging-diverging nozzles are therefore not practical or desirable for an aircraft engine operating over a wide range of power in its flight envelope.

Accordingly, it is desired to have a relatively simple fixed converging-diverging exhaust nozzle with variable flow area capability for enhancing engine performance without complex area control mechanisms and attendant weight.

SUMMARY OF THE INVENTION

An exhaust nozzle for a gas turbine engine includes a converging inlet duct disposed in flow communication with a diverging outlet duct at a throat therebetween. An ejection slot is disposed at the throat, and compressed air from the engine is selectively injected through the slot for fluidically varying flow area at the throat for exhaust gases from the engine.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1:
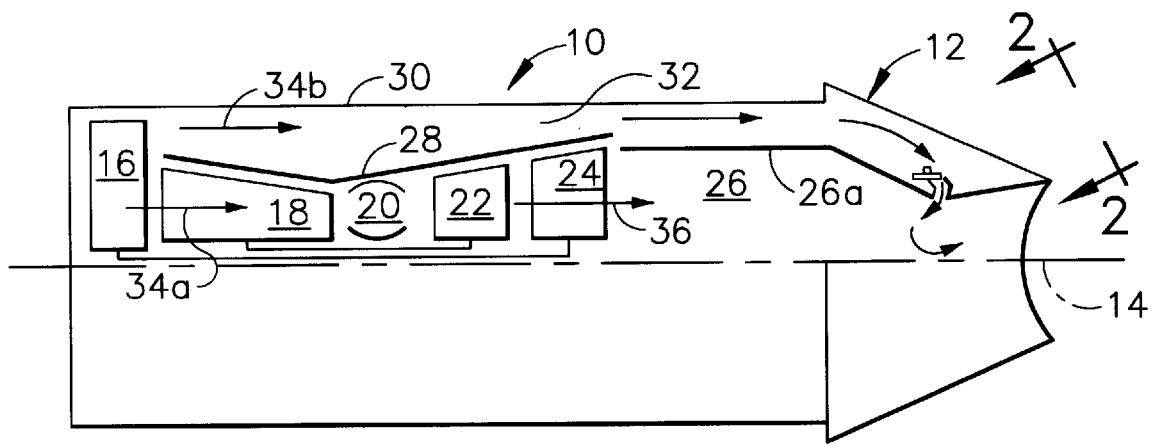
FIG. 1 is a schematic representation of an exemplary augmented turbofan aircraft gas turbine engine having a variable area exhaust nozzle in accordance with an exemplary embodiment of the present invention.

Illustrated schematically in FIG. 1 is a turbofan aircraft gas turbine engine 10 including a variable area exhaust nozzle 12 in accordance with an exemplary embodiment of the present invention. The engine 10 is axisymmetrical about a longitudinal or axial centerline axis 14 and includes in serial flow communication a fan 16, multi-stage axial compressor 18, annular combustor 20, high pressure turbine (HPT) 22, low pressure turbine (LPT) 24, and an afterburner or augmenter 26. The HPT 22 is suitably joined to the compressor 18 by one rotor shaft, and the LPT 24 is suitably joined to the fan 16 by another rotor shaft. An annular inner casing 28 surrounds the core engine downstream of the fan 16, and the augmenter 26 includes an annular combustion liner 26a. The inner casing 28 and augmenter liner 26a are spaced radially inwardly from an annular outer casing 30 to define an annular bypass duct 32 extending from the fan 16 to the exhaust nozzle 12.

During operation, ambient air enters the engine 10 and is compressed in the compressor 18 for providing pressurized or compressed air 34a which is mixed with fuel in the combustor 20 and ignited for generating hot combustion gases 36 which flow through the HPT 22 and LPT 24 which extract energy therefrom and discharge the exhaust gases into the augmenter 26 for discharge from the engine through the exhaust nozzle 12. The HPT 22 powers the compressor 18, and the LPT 24 powers the fan 16.

The fan 16 pressurizes a portion of the inlet air as compressed bypass air 34b which bypasses the core engine and flows through the bypass duct 32 around the augmenter liner 26a to the exhaust nozzle 12.

But for the exhaust nozzle 12, the gas turbine engine 10 illustrated in FIG. 1 is conventional in configuration and operation, and is operable over varying output power settings including idle, cruise, and maximum afterburner. Accordingly, the exhaust nozzle 12 is variable in flow area in accordance with the present invention for enhancing efficiency of the engine 10 over its operating range.

Figure 2:
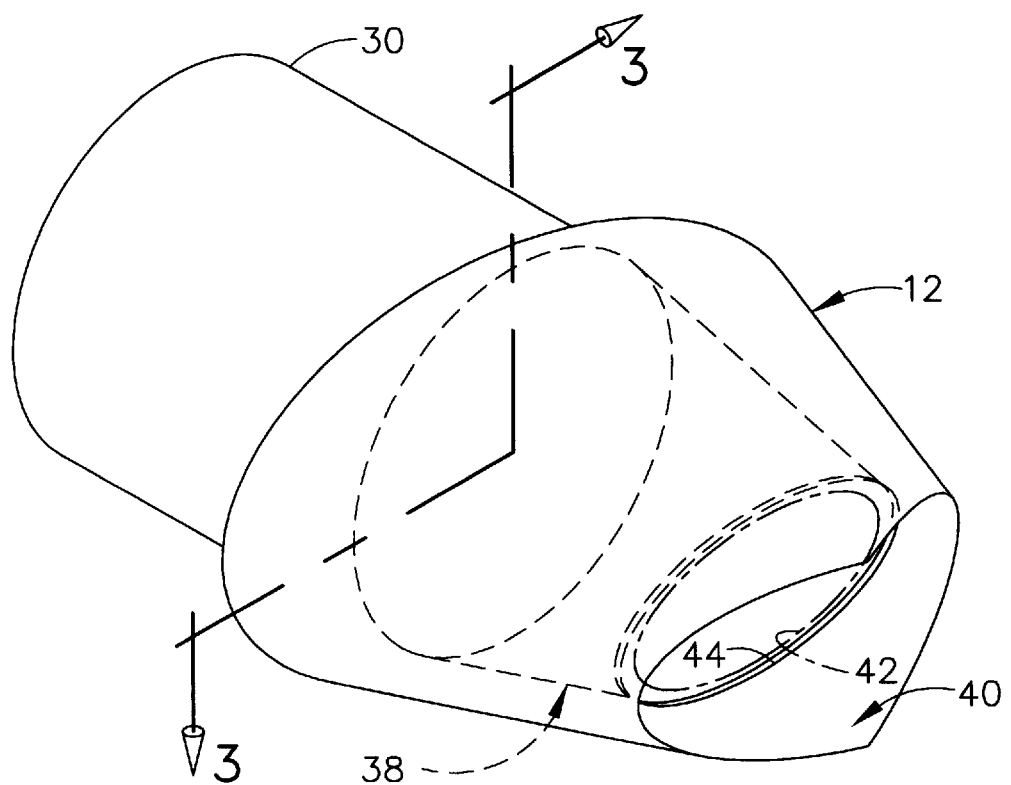
FIG. 2 is an isometric view of the exhaust nozzle illustrated in FIG. 1 in the general direction indicated by line 2—2.
Figure 3:
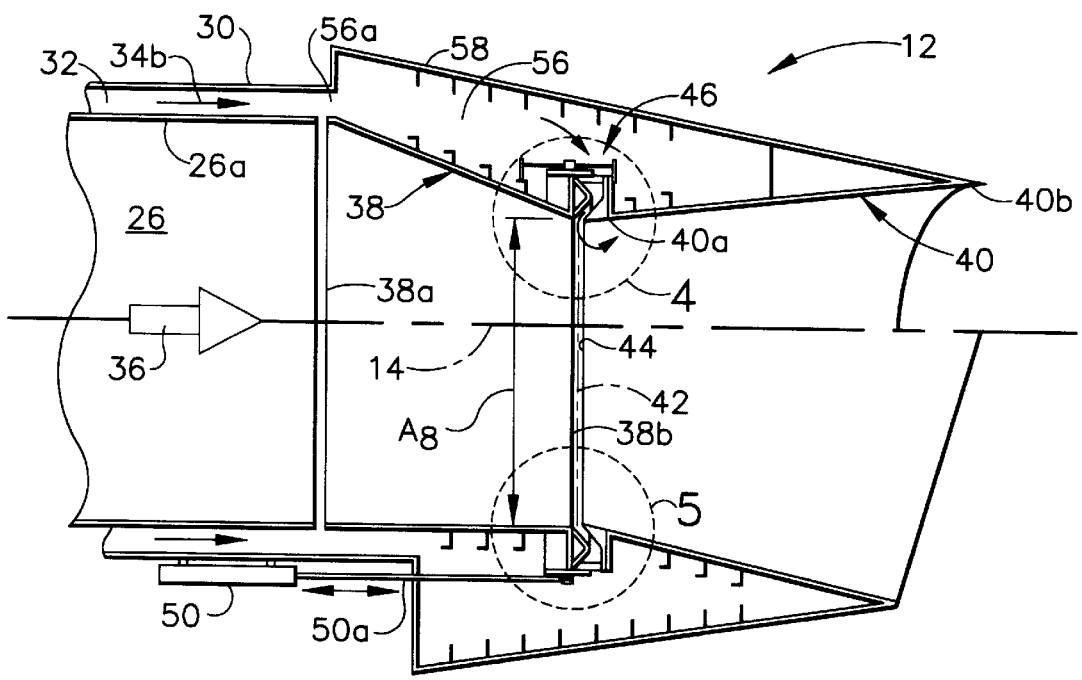
FIG. 3 is an elevational, partly sectional view through the exhaust nozzle illustrated in FIG. 2 along vertical and horizontal planes represented by the jogged line 3—3.

More specifically, and referring to FIGS. 2 and 3, the exhaust nozzle 12 includes a fixed, non-variable converging inlet duct or channel 38 disposed in flow communication with the augmenter 26 for receiving the exhaust gases 36 therefrom. Disposed in flow communication coaxially with the inlet duct 38 about the engine centerline axis 14 is a fixed, non-variable diverging outlet duct or channel 40 which joins the inlet duct 38 at an annular throat 42 having a minimum flow area designated $A_8$.

The inlet and outlet ducts 38, 40 may take any suitably form including corresponding support frames 38c, 40c to which are suitable attached flow liners 38d, 40d which may be suitably cooled as desired. The frames 38c, 40c are sized to withstand structural loads and differential pressures during operation and suitably support the flow liners 38d, 40d.

In the exemplary embodiment illustrated in FIGS. 2 and 3, the inlet duct 38 defines a converging nozzle having a circular or cylindrical leading edge 38a defining an inlet for receiving the exhaust gases 36 from the augmenter 26 during operation. The cylindrical leading edge 38a transitions to an elliptical trailing edge 38b at the throat 42. The inlet duct 38 converges in area between the leading and trailing edges 38a,b thereof in a fixed area ratio of suitable value.

The outlet duct 40 is correspondingly elliptical from its leading edge 40a at the throat 42 to its trailing edge 40b, and defines a diverging nozzle having a fixed diverging area ratio of suitable value. As shown in FIGS. 2 and 3, the exhaust nozzle 12 transitions from the circular profile to the elliptical profile, with the major axis of the ellipse being in the horizontal plane, and the minor axis of the ellipse being in the vertical plane. However, the specific configuration or profile of the exhaust nozzle 12 may be otherwise selected as desired to include completely circular or rectangular profiles, for example, for each specific nozzle configuration desired.

However, in all embodiments the inlet and outlet ducts 38, 40 are fixed, non-variable flow nozzles. In order to provide variable area capability of the otherwise fixed area exhaust nozzle 12, the nozzle 12 further includes a circumferentially extending annular injection slot 44 disposed coaxially at the throat 42 as initially shown in FIGS. 2 and 3. Cooperating with the injection slot 44 are suitable means for selectively injecting compressed air, such as the bypass air 34b in the engine 10, through the injection slot 44 for selectively and fluidically varying the effective flow area $A_8$ for the exhaust gases 36 at the throat 42. By injecting the bypass air 34b at the throat 42 with suitable momentum, the available flow area for the exhaust gases 36 may be reduced for effectively varying the throat area $A_8$ fluidically instead of mechanically with a solid boundary. In an alternate embodiment, compressor discharge pressure air may be suitably routed to the injection slot 44.

Figure 4:
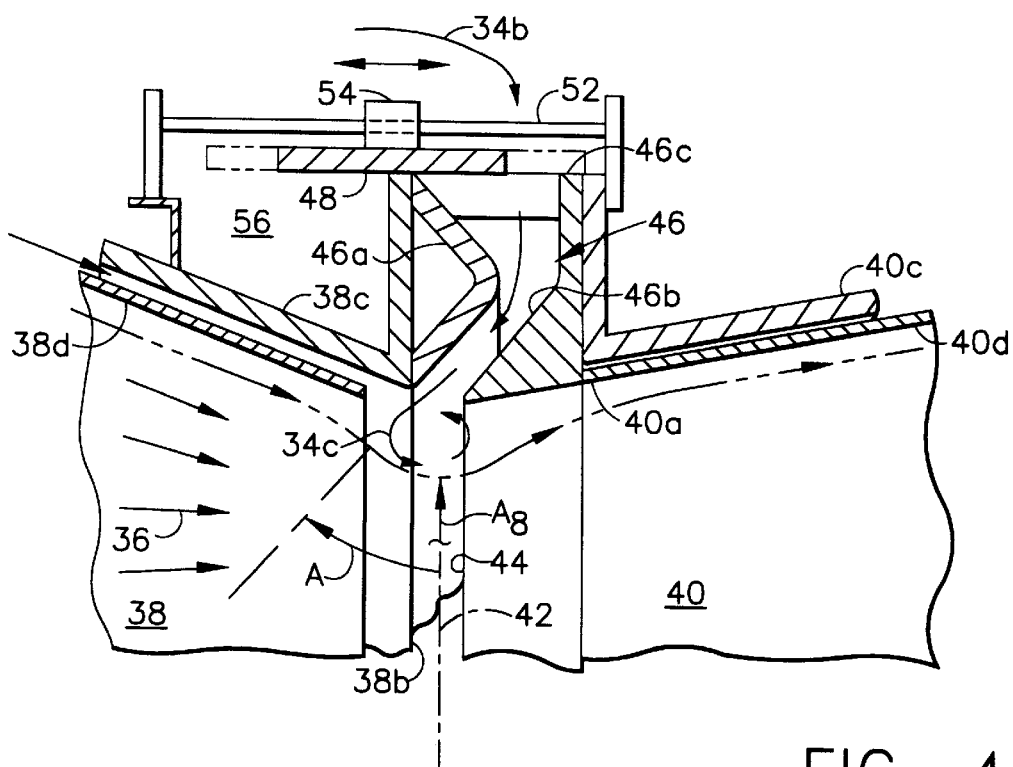
FIG. 4 is an enlarged partly sectional view of flow guides for injecting compressed air at the throat between the converging and diverging ducts illustrated in the vertical plane of FIG. 3 in the dashed line labeled 4.

A portion of the injecting means in accordance with a preferred embodiment of the present invention is illustrated in more particularity in FIG. 4. The injecting means preferably includes a radially inwardly extending converging injection nozzle 46 which terminates at the injection slot 44 defining an outlet therefor. The injection nozzle 413 is preferably directed in part at its radially inner portion axially forward toward the injection slot 44 to define an upstream injection angle A which is preferably as close to 90° as practical, with zero degrees (0°) being radially inward, and has a value of about 60°, for example, from the radial axis for injecting the compressed air, designated 34c, in an initial upstream direction in the inlet duct 38.

As shown in FIG. 4, the injection air 34c has suitable momentum to create a buffer or recirculation zone of primarily only the injection air 34c radially inwardly of the injection slot 44 to fluidically constrict the flow of exhaust gases 38 to a smaller effective area $A_8$ at the physical throat 42. The physical throat 42 defines the maximum value of the throat area $A_8$, whereas the maximum injection of the injection air 34c defines the minimum value of the effective throat area $A_8$.

The injection air 34c is preferably directed from the injection slot 44 initially in the upstream direction relative to the exhaust gases 36 to maximize the affect in throat flow area $A_8$. Initially directing the injection air 34c in the downstream direction from the slot 44 and into the outlet duct 40 is not desirable due to the inherent gas expansion within the outlet duct 40 which would entrain therewith the injection air 34c minimizing its affect for throat flow area control.

Figure 5:
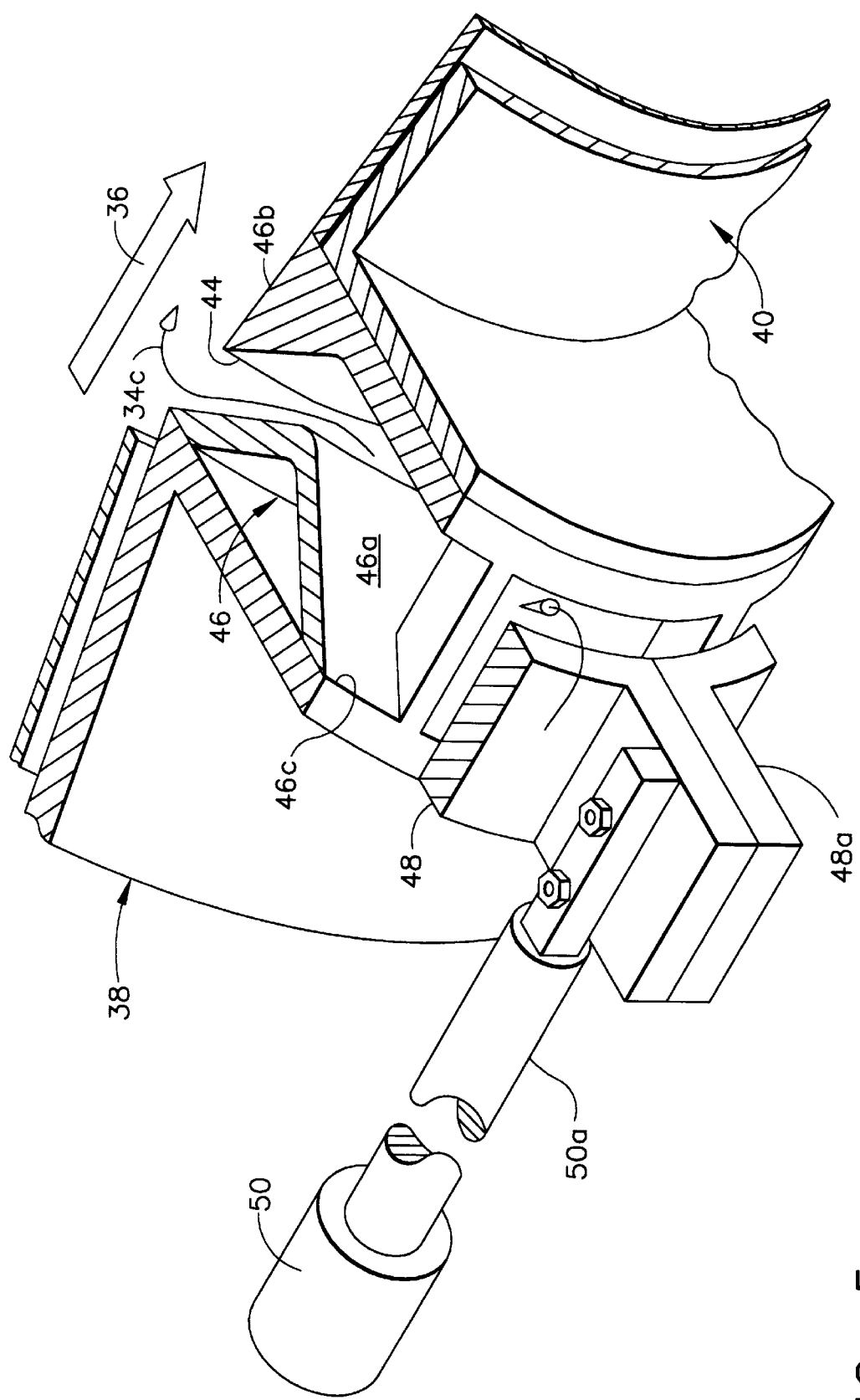
FIG. 5 is a partly sectional, isometric view of a portion of the flow guides and cooperating valve illustrated in the horizontal plane of FIG. 3 within the dashed circle labeled 5.

As shown in FIG. 4, the injecting means preferably also include an annular valve 48 disposed at the radially outer end of the injection nozzle 46 to vary flow therethrough of the injection bypass air 34b. The valve 48 may take any suitable form to match the profile of the injection nozzle 46, and in the exemplary embodiment illustrated in FIGS. 4 and 5 may be formed in two halves having a horizontal splitline and end flanges 48a which are suitably joined together to form a cylindrical ring. As shown in FIGS. 3 and 5, a plurality of suitable linear actuator 50 are mounted to the outer casing 30 and have reciprocating output rods 50a joined to the valve 48 for selectively axially translating the valve forward and aft as desired for uncovering and covering the injection nozzle 46 to control flow therethrough. In the exemplary embodiment illustrated, two actuators 50 are mounted on opposite sides of the valve 48 in the horizontal plane to axially reciprocate or translate the valve 48 between opposite open and closed positions, shown in phantom line in FIG. 4, to fully open or fully close the flow passage of the injection nozzle 46.

As shown in FIG. 4, a plurality of circumferentially spaced apart, axially extending support rods 52 are fixedly mounted at opposite ends thereof to the corresponding frames of the inlet and outlet ducts 38, 40. For example, four of the rods 52 are equiangularly spaced around the valve 48, with each rod 52 having a bushing or bearing 54 slidably mounted thereon and fixedly mounted to the valve 48. Accordingly, as the two actuators 50 translate the valve 48 axially forward and aft, the bushings 54 slide over the support rods 52 for maintaining uniform translation of the valve 48.

The injection nozzle 46 is illustrated in more particularity in FIGS. 4 and 5 and includes a first or axially forward flow guide 46a which is generally arcuate or convex in radial section for turning the injection air 34c from aft to forward directions. A second or axially aft flow guide 46b is spaced axially aft from the forward guide 46a, and is complementary therewith to converge in flow area from a guide inlet 46c to the injection slot 44 which defines the guide outlet. The forward and aft flow guides 46a,b are preferably configured to effect the injection angle A of about 60° in the preferred embodiment. The valve 48 is suitably positioned to axially slide across the guide inlet 46c to uncover or block the inlet 46c as required for varying flow of the injection air 34c therethrough.

As shown in FIG. 3, the injecting means preferably also include an annular plenum 56 surrounding the inlet duct 38, and a forward portion of the outlet duct 40, and is disposed in flow communication with the bypass duct 32 of the engine for receiving the compressed air 34b therefrom. In the exemplary embodiment illustrated in FIG. 3, the plenum 56 includes an annular inlet 56a sized in diameter to engage the bypass duct 32 in flow communication for receiving therefrom the bypass air 34b. The plenum 56 is defined radially between the inlet duct 38 and a coaxial outer duct or shell 58 which is suitably joined to the outer casing 30. The plenum 56 is preferably sized to house or include substantially all the components of the injecting means including the flow guides 46a,b, control valve 48, and support rods 52. The actuators 50 are preferably mounted outside the plenum 56, but in an alternate embodiment may be mounted entirely inside the plenum 56 if desired. In this way, most, if not all, of the components of the injecting means may be readily mounted in a relatively small area inside the exhaust nozzle 12 itself.

Most significantly, the plenum 56 is sufficiently large for collecting the bypass air 34b therein under primarily only static pressure, without a significant amount of dynamic pressure, to more uniformly circumferentially distribute the bypass air 34b into the injection nozzle 46 to ensure uniformity of profile of the fluidically controlled flow area $A_8$ at the throat 42. Static pressure within the plenum 56 reduces dynamic pressure losses between the bypass air 34b and the components around which it flows. The flow guides 46a,b as shown in FIG. 4 preferably converge toward the injection slot 44 to maximize the available momentum of the injection air 34c to control the flow area $A_8$. During maximum open operation of the injection nozzle 46, the velocity of the injection air 34c may approach Mach 1.

Since the inlet and outlet ducts 38, 40 are fixed members, throat flow area control is varied solely by varying flow of the injection air 34c from the injection slot 44 using the simple axial translation of the valve 48 alone.

The exhaust nozzle 12 disclosed above in a preferred embodiment substantially reduces complexity of nozzle construction by using fixed area inlet and outlet ducts 38, 40, with throat flow area control being effected by injecting the compressed air 34c through the injection slot 44. The nozzle therefore has fewer components, and simpler components which are more readily manufactured at reduced cost. The injection nozzle 46 is closely coupled directly to the injection slot 44 for maximizing the effectiveness of throat flow area controlled by the injection air 34c and enhancing uniformity in circumferential distribution thereof. Mounting the injecting means within the plenum 56 also reduces pressure losses associated therewith, which in turn increases nozzle performance.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

I claim:

1. An exhaust nozzle for a gas turbine engine comprising:
   a converging inlet duct for receiving exhaust gases from said engine;
   a diverging outlet duct disposed in flow communication with said inlet duct at a throat;
   a circumferentially extending injection slot disposed at said throat; and
   means disposed at said injection slot for selectively injecting compressed air from said engine through said injection slot for varying flow area of said exhaust gases at said throat.

2. A nozzle according to claim 1 wherein said injecting means comprise a radially inwardly extending converging injection nozzle terminating at said injection slot.

3. A nozzle according to claim 2 wherein said injection nozzle is directed in part axially forward toward said injection slot to define an upstream injection angle for said injection air in said inlet duct.

4. A nozzle according to claim 3 wherein said injecting means further comprise:
   an annular valve disposed at said injection nozzle to vary flow therethrough of said injection air; and
   a plurality of actuators operatively joined to said valve to axially reciprocate said valve between open and closed positions.

5. A nozzle according to claim 4 wherein said injection nozzle comprises:
   a forward flow guide being arcuate in radial section; and
   an aft flow guide spaced axially aft from said forward guide, and being complementary therewith to converge to said injection slot.

6. A nozzle according to claim 5 wherein said injecting means further comprise:
   a plenum surrounding said inlet duct and disposed in flow communication with said engine for receiving said compressed air therefrom; and
   said plenum being sized to include said injecting means and provide thereto said compressed air under primarily only static pressure.

7. A nozzle according to claim 6 wherein said inlet and outlet ducts include fixed converging and diverging areas, and said throat flow area is varied solely by varying flow of said injection air from said injection slot.

8. A nozzle according to claim 6 wherein:
   said inlet duct includes a circular leading edge and transitions to an elliptical trailing edge at said throat; and
   said outlet duct is elliptical.

9. A nozzle according to claim 6 wherein:
   said engine includes an augmenter having an annular bypass duct therearound for channeling said compressed air from a fan thereof; and
   said plenum has an annular inlet sized to engage said bypass duct in flow communication for receiving therefrom said compressed air.

10. A nozzle according to claim 6 wherein said forward and aft flow guides are configured to effect said injection angle at about 60°.

11. An exhaust nozzle for a gas turbine engine comprising:
    a converging inlet duct for receiving exhaust gases from said engine;
    a diverging outlet duct disposed in flow communication with said inlet duct at a throat;

a circumferentially extending injection slot disposed at said throat;

a plenum surrounding said inlet duct and disposed in flow communication with said engine for receiving compressed air therefrom; and means disposed at said injection slot for selectively injecting said compressed air from said engine through said injection slot for decreasing flow area of said exhaust gases at said throat.

12. A nozzle according to claim 11 wherein said injecting means comprise:

a radially inwardly extending converging injection nozzle disposed in said plenum and terminating at said injection slot; and an annular valve disposed in said plenum at said injection nozzle to vary flow therethrough of said injection air.

13. A nozzle according to claim 12 wherein said plenum is sized for collecting said compressed air from said engine under primarily only static pressure.

* * * * *